US 9,470,316 B2

(12) United States Patent
Matsumura et al.

(10) Patent No.: US 9,470,316 B2
(45) Date of Patent: Oct. 18, 2016

(54) PROTECTIVE COVER AND MANUFACTURING METHOD THEREOF

(71) Applicant: TOKAI RUBBER INDUSTRIES, LTD., Aichi (JP)

(72) Inventors: Hiroyuki Matsumura, Aichi (JP); Yorikazu Nakamura, Aichi (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 1 day.

(21) Appl. No.: 14/046,043

(22) Filed: Oct. 4, 2013

(65) Prior Publication Data

US 2014/0035232 A1 Feb. 6, 2014

Related U.S. Application Data

(63) Continuation of application No. PCT/JP2011/006366, filed on Nov. 15, 2011.

(51) Int. Cl.
| | |
|---|---|
| *F16J 3/00* | (2006.01) |
| *F16J 15/52* | (2006.01) |
| *F16F 9/38* | (2006.01) |
| *F16J 3/04* | (2006.01) |

(Continued)

(52) U.S. Cl.
CPC .................. *F16J 15/52* (2013.01); *F16F 9/38* (2013.01); *F16J 3/041* (2013.01); *F16J 3/043* (2013.01); *B29C 49/04* (2013.01); *B29L 2022/025* (2013.01); *B29L 2031/755* (2013.01)

(58) Field of Classification Search
CPC ............ F16J 3/042; F16J 15/52; F16J 3/041; F16J 3/043; F16D 3/845; F16F 9/38; B29C 49/04; B29L 2022/025; B29L 2031/755
USPC ........................... 277/634, 636, 635; 464/175
See application file for complete search history.

(56) References Cited

U.S. PATENT DOCUMENTS

| 4,114,460 A | * | 9/1978 | Oto ............................. 277/636 |
| 5,176,390 A | * | 1/1993 | Lallement ................... 277/636 |

(Continued)

FOREIGN PATENT DOCUMENTS

| JP | 49-029219 | 8/1974 |
| JP | 58-116858 | 8/1983 |

(Continued)

OTHER PUBLICATIONS

China Office action, dated May 29, 2014 along with an English translation thereof.

(Continued)

*Primary Examiner* — Kristina Fulton
*Assistant Examiner* — Nathan Cumar
(74) *Attorney, Agent, or Firm* — Greenblum & Bernstein, P.L.C.

(57) ABSTRACT

A protective cover including a bellows portion wherein a plurality of valleys and peaks are arranged alternately. The valleys include a plurality of large valleys and a plurality of intermediate valleys whose inside and outside diameter dimensions at bottoms are greater than those of the large valleys, and the large valleys and the intermediate valleys are arranged alternately. Small valleys whose inside and outside diameter dimensions at bottoms are greater than those of the intermediate valleys are respectively arranged between the large valleys and the intermediate valleys. The peaks are respectively arranged between the large valleys and the small valleys as well as between the intermediate valleys and the small valleys, and apexes of the peaks have a same outside diameter dimension as one another. The apexes of the peaks are made thinner than the bottoms of the large valleys.

3 Claims, 7 Drawing Sheets

(51) Int. Cl.
*B29L 31/00* (2006.01)
*B29L 22/02* (2006.01)
*B29C 49/04* (2006.01)

(56) References Cited

U.S. PATENT DOCUMENTS

| | | | | |
|---|---|---|---|---|
| 5,308,091 A | * | 5/1994 | Mihalcin | 277/636 |
| 5,853,178 A | * | 12/1998 | Wydra et al. | 277/636 |
| 7,033,531 B2 | * | 4/2006 | Saito et al. | 264/211 |
| 7,090,584 B2 | * | 8/2006 | Wang et al. | 464/175 |

FOREIGN PATENT DOCUMENTS

| JP | 59 180049 | * | 1/1984 |
|---|---|---|---|
| JP | 59 180049 MT | * | 1/1984 |
| JP | 59 180049 WT | * | 1/1984 |
| JP | 59-152285 | | 10/1984 |
| JP | 59-180049 | | 12/1984 |
| JP | 4-000973 | | 1/1992 |
| JP | 10-267124 | | 10/1998 |
| JP | 10-331897 | | 12/1998 |

OTHER PUBLICATIONS

International Preliminary Report on Patentability mailed May 30, 2014.
Japan Office action, dated Aug. 5, 2013 along with an English language translation thereof.
International Search Report of PCT/JP2011/006366 dated Feb. 21, 2012.

* cited by examiner

PROTECTIVE COVER AND MANUFACTURING METHOD THEREOF

INCORPORATED BY REFERENCE

This is a Continuation of International Application No. PCT/JP2011/006366 filed on Nov. 15, 2011, the disclosure of which including the specification, drawings and abstract is incorporated herein by reference in its entirety.

BACKGROUND OF THE INVENTION

1. Field of the Invention

The present invention relates generally to a protective cover adapted to be externally fitted onto components such as shock absorbers of automotive suspensions, robot arms, or the like, which are to be permitted extension/contraction or bend, and prevent adhesion of water, dust, or other foreign matters to the components. The present invention also relates to a manufacturing method of the same.

2. Description of the Related Art

Conventionally, tubular protective covers (dust covers) are generally externally fitted onto shock absorbers of automotive suspensions, robot arms, or the like serving as components to be attached, in order to permit extension/contraction or bend while preventing adhesion of water, grit, or other foreign matters. The protective cover includes, in at least a portion thereof, a bellows portion having peaks and valleys formed in continuous fashion, and is endowed with elasticity in the axial direction owing to deformation of the bellows portion. Japanese Examined Utility Model Publication No. JP-Y-4-973 discloses one example thereof.

Meanwhile, it is desirable for the protective cover to have a sufficiently large extension/contraction stroke (differential between the axial dimension during extension and the axial dimension during contraction) in order to ensure followability to the extension/contraction or bend of the components to be attached.

Thus, in order to obtain a small axial dimension during contraction, the protective cover described in JP-Y-4-973 proposes a structure in which large valleys and small valleys are alternately arranged in an alternating sequence so that the small valleys are wrapped by the large valleys during contraction.

However, the protective cover described in JP-Y-4-973 sometimes finds it difficult to ensure sufficient elasticity and the required extension/contraction stroke may not be achieved. Specifically, with the protective cover in which the large valleys and the small valley are just alternately formed, if the depth (D) of the small valleys is made small in order to obtain a small axial dimension during contraction, the axial dimension during extension is likely to be insufficient. On the other hand, if the depth of the small valleys is made large in order to obtain a large axial dimension during extension, the inner peripheral edges of the small valleys are positioned in the vicinity of the inner peripheral edges of the large valleys so that the axial dimension during contraction is likely to be large, making it difficult to ensure a sufficient extension/contraction stroke.

SUMMARY OF THE INVENTION

The present invention has been developed in view of the background described above, and it is an object of the present invention to provide a protective cover with a novel structure capable of ensuring a large extension/contraction stroke in the axial direction by obtaining a large axial dimension during extension while obtaining a small axial dimension during contraction, and to provide a manufacturing method thereof.

Specifically, the first mode of the present invention provides a protective cover being of a tubular shape and including a bellows portion wherein a plurality of valleys outwardly concave and a plurality of peaks outwardly convex are arranged in an alternating sequence, wherein the valleys of the bellows portion comprise a plurality of large valleys and a plurality of intermediate valleys whose inside and outside diameter dimensions at bottoms are greater than those of the large valleys, and the large valleys and the intermediate valleys are arranged in an alternating sequence, small valleys whose inside and outside diameter dimensions at bottoms are greater than those of the intermediate valleys are respectively arranged between the large valleys and the intermediate valleys, the peaks are respectively arranged between the large valleys and the small valleys as well as between the intermediate valleys and the small valleys, and apexes of the peaks have a same outside diameter dimension as one another, and the apexes of the peaks are made thinner than the bottoms of the large valleys.

The protective cover according to the above first mode is able to obtain a large axial dimension during extension without needing increase in diameter of the bellows portion, owing to the small valleys arranged between the large valleys and the intermediate valleys. On the other hand, the axial dimension of the protective cover during contraction is made small by the large valleys and the intermediate valleys being arranged in an alternating sequence while the inside and outside diameter dimensions at the bottoms of the intermediate valleys being made greater than those of the large valleys. Moreover, owing to the apexes of the peaks made thinner than the bottoms of the large valleys, the axial dimension of the protective cover during contraction is prevented from increasing at the outside peripheral portion where the small valleys are provided. With these arrangements, it is possible to realize a protective cover capable of ensuring a large extension/contraction stroke in the axial direction.

Furthermore, since the apexes of the plurality of peaks have the same outside diameter dimensions as one another, the apexes can be provided with the outside diameter dimension which is as large as possible across the entire length of the bellows portion. This makes it possible to efficiently obtain a sufficient axial dimension of the protective cover during extension, thereby enhancing extension/contraction stroke thereof.

A second mode of the present invention provides the protective cover according to the first mode wherein differential between the outside diameter dimension at the apexes of the peaks and the outside diameter dimension at the bottoms of the intermediate valleys is not less than two-thirds of differential between the outside diameter dimension at the apexes of the peaks and the inside diameter dimension at the bottoms of the large valleys.

According to the second mode, the bottoms of the intermediate valleys are positioned sufficiently away from the bottoms of the large valleys to the outer peripheral side. This will prevent interference between the bottoms of the intermediate valleys and the bottoms of the large valleys during contraction of the protective cover. Thus, the axial dimension of the protective cover can be made small, thereby enhancing extension/contraction stroke thereof.

A third mode of the present invention provides the protective cover according to the first or second mode wherein differential between the outside diameter dimension at the apexes of the peaks and the inside diameter dimension at the bottoms of the small valleys is not more than one-third of differential between the outside diameter dimension at the apexes of the peaks and the inside diameter dimension at the bottoms of the large valleys.

According to the third mode, the bottoms of the small valleys are positioned sufficiently away from the bottoms of the intermediate valleys to the outer peripheral side. This will prevent interference between the bottoms of the small valleys and the bottoms of the intermediate valleys during contraction of the protective cover. Thus, the axial dimension of the protective cover can be made small, thereby enhancing extension/contraction stroke thereof.

A fourth mode of the present invention provides the protective cover according to any one of the first through third modes wherein the bellows portion becomes progressively thinner towards an outer peripheral side.

According to the fourth mode, the bellows portion becomes progressively thinner towards the outer peripheral side. Thus, the medial sections of the large valleys, which overlap with the bottoms of the intermediate valleys in the axial direction during contraction, are made thinner than the bottoms of the large valleys, so as to more minimize the axial dimension. Besides, since the formation zone of the small valleys is thin-walled, it is possible to prevent the axial dimension of the protective cover during contraction from increasing due to the formation of the small valleys.

A fifth mode of the present invention provides the protective cover according to any one of the first through fourth modes wherein the bellows portion is made of a material that includes a thermoplastic resin.

According to the fifth mode, by being made of a material that includes a thermoplastic resin, the bellows portion can be readily thin-walled. This will enhance elasticity of the bellows portion while achieving reduced weight or reduced cost.

A sixth mode of the present invention provides a method of manufacturing the protective cover according to any one of the first through fifth modes, comprising the following steps of: preparing a mold for molding whose cavity has a concave/convex surface on an inside face corresponding to the bellows portion; forming a bag-shaped parison within the cavity of the mold by softening the thermoplastic resin by heating; expanding the parison by blowing a compressed gas into a center hole of the parison and pressing the parison against the inside face of the cavity of the mold so as to obtain a molded article; hardening the molded article by cooling; and taking out the molded article which is hardened by cooling from the mold and cutting away a prescribed part of the molded article.

With the manufacturing method of the protective cover according to the above sixth mode, it is possible to readily obtain the bellows portion such that the apexes of the peaks are made thinner than the bottoms of the large valleys owing to the thickness differential afforded especially by the blow molding.

According to the present invention, the valleys of the bellows portion includes the large valleys, the intermediate valleys whose inside and outside diameter dimensions at bottoms are greater than those of the large valleys, and the small valleys whose inside and outside diameter dimensions at bottoms are greater than those of the intermediate valleys. With this arrangement, during extension of the bellows portion, deformation of the large valleys and the intermediate valleys as well as deformation of the small valleys can efficiently ensure a sufficient axial dimension without needing increase in diameter of the bellows portion. Moreover, during contraction of the bellows portion, overlap between the bottoms of the large valleys and the intermediate valleys as well as overlap between the bottoms of the intermediate valleys and the small valleys can be avoided, thereby minimizing the axial dimension. In addition, since the apexes of the peaks are made thinner than the bottoms of the large valleys, increase in the axial dimension due to formation of the small valleys will be prevented. These arrangements make it possible to realize the protective cover capable of ensuring a large extension/contraction stroke in the axial direction.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
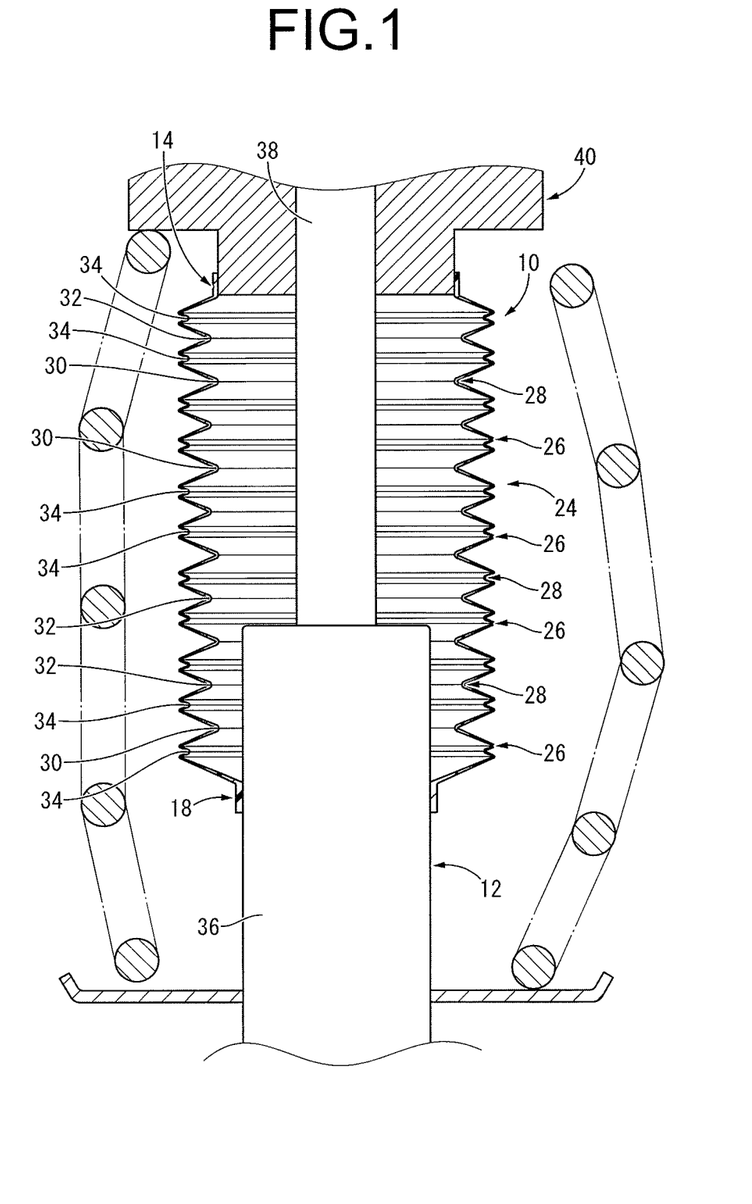
FIG. 1 is an elevational view in axial or vertical cross section showing a protective cover in the form of a dust cover under installation in a suspension mechanism according to a first embodiment of the present invention.
Figure 2:
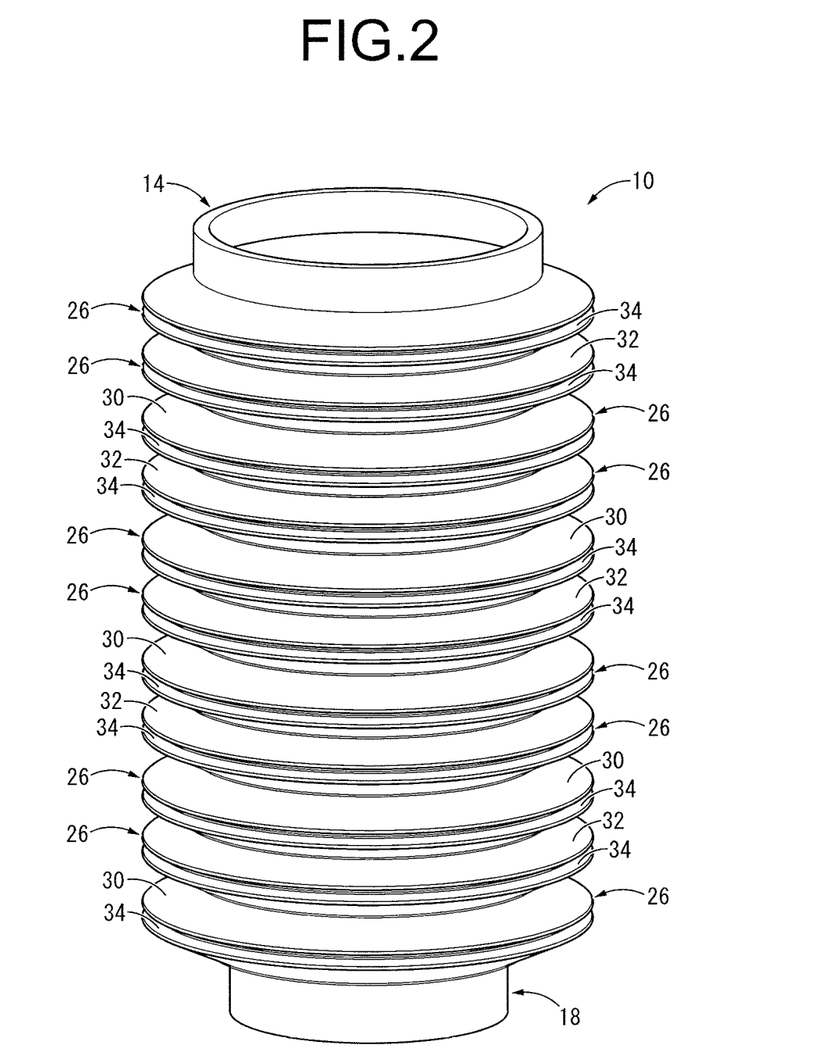
FIG. 2 is a perspective view of the dust cover shown in FIG. 1.
Figure 3:
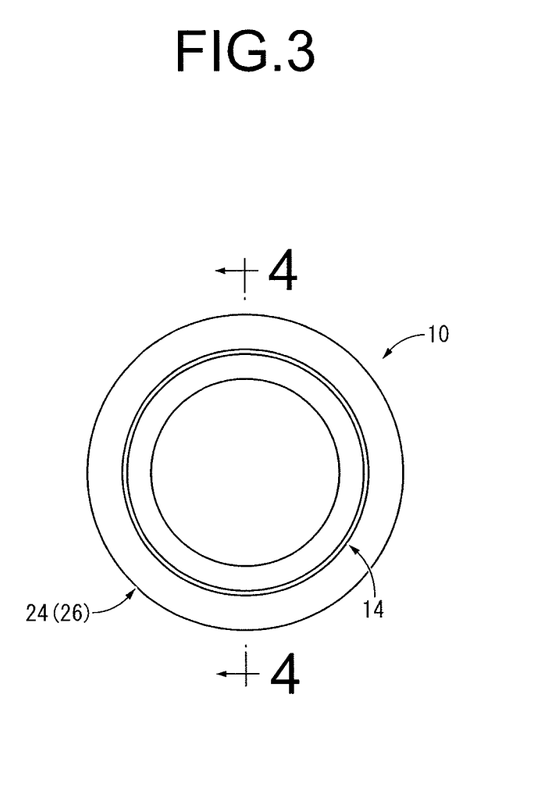
FIG. 3 is a top plane view of the dust cover shown in FIG. 1.

Referring to FIG. 1, there is depicted a dust cover 10 as a first embodiment of the protective cover constructed according to the present invention, in a state of being mounted onto a shock absorber 12 of a suspension mechanism. In the description hereinbelow, as a general rule the vertical direction refers to the vertical direction in FIG. 1, which is also the axial direction of the dust cover 10.

Described more specifically, as depicted in FIGS. 2 through 5, the dust cover 10 has a thin-walled, generally round tubular shape overall, and is endowed with elasticity by being made of a rubber elastic body, synthetic resin, or the like. While no particular limitation is imposed as to the rubber elastic body or synthetic resin that forms the dust cover 10, in the present embodiment, for example, a material made from polypropylene (PP) serving as a thermoplastic resin mixed with ethylene-propylene rubber (EPDM) and dispersed is employed, because of its excellent weatherability, formability or the like. However, in case of forming using a thermoplastic resin, it could also be possible to employ, for example, various thermoplastic elastomers including polyolefin-based resins such as polypropylene, polyethylene or the like, polyamide-based resins, polyvinyl chloride-based resins, polyester-based resins, urethane-based resins, styrene-based resins, olefin-based resins, or the like. Also, in case of forming using a rubber elastic body, either synthetic rubber or natural rubber can be used.

The dust cover 10 has an upper mounting portion 14 of generally round tubular shape on its axially upper end portion, and a lower mounting portion 18 of generally round tubular shape on its axially lower end portion.

In addition, in the axially medial portion of the dust cover 10, a bellows portion 24 is provided. The bellows portion 24 includes a plurality of peaks 26 outwardly convex and a plurality of valleys 28 outwardly concave, and the peaks 26 and the valleys 28 are arranged in an alternating sequence.

The peaks 26 are formed continuously about the entire circumference with a prescribed cross sectional shape which progressively becomes narrower in the axial direction towards the outer peripheral side. Besides, apexes of the plurality of peaks 26 have the same outside diameter dimension as one another, so that the maximum outside diameter dimension of the bellows portion 24 is substantially unchanging throughout.

The valleys 28 are respectively arranged between the peaks 26 adjacent to one another in the axial direction. Each of the valleys 28 is formed continuously about the entire circumference with a V-shaped cross section which progressively flares in the axial direction towards the outer peripheral side.

Moreover, the valleys 28 comprise large valleys 30, intermediate valleys 32, and small valleys 34 each formed in plurality. The large valley 30 is the valley such that the dimension from the inside peripheral face of its bottom to the apex of the peak 26 (the depth dimension) is greatest, in other words, the inside and outside diameter dimensions at its bottom are smallest, and has a V-shaped cross section which progressively flares in the axial direction towards the outer peripheral side. Meanwhile, the intermediate valley 32 is the valley whose inside and outside diameter dimensions at its bottom are greater than those of the large valley 30, and has a V-shaped cross section which progressively flares in the axial direction towards the outer peripheral side. It should be appreciated that the plurality of large valleys 30 and the plurality of intermediate valleys 32 are arranged in an alternating sequence in the axial direction.

The small valley 34 is the valley whose inside and outside diameter dimensions at its bottom are even greater than those of the intermediate valley 32, and has a V-shaped cross section which progressively flares in the axial direction towards the outer peripheral side. The small valleys 34 are respectively arranged between the large valleys 30 and the intermediate valleys 32 in sequence, and the peaks 26 are respectively arranged between the large valleys 30 and the small valleys 34 as well as between the intermediate valleys 32 and the small valleys 34. In other words, a set constituted by the large valley 30, the small valley 34, the intermediate valley 32, and the small valley 34 arranged in that order in the axial direction is arranged repeatedly in the axial direction so as to define the valleys 28.

Figure 4:
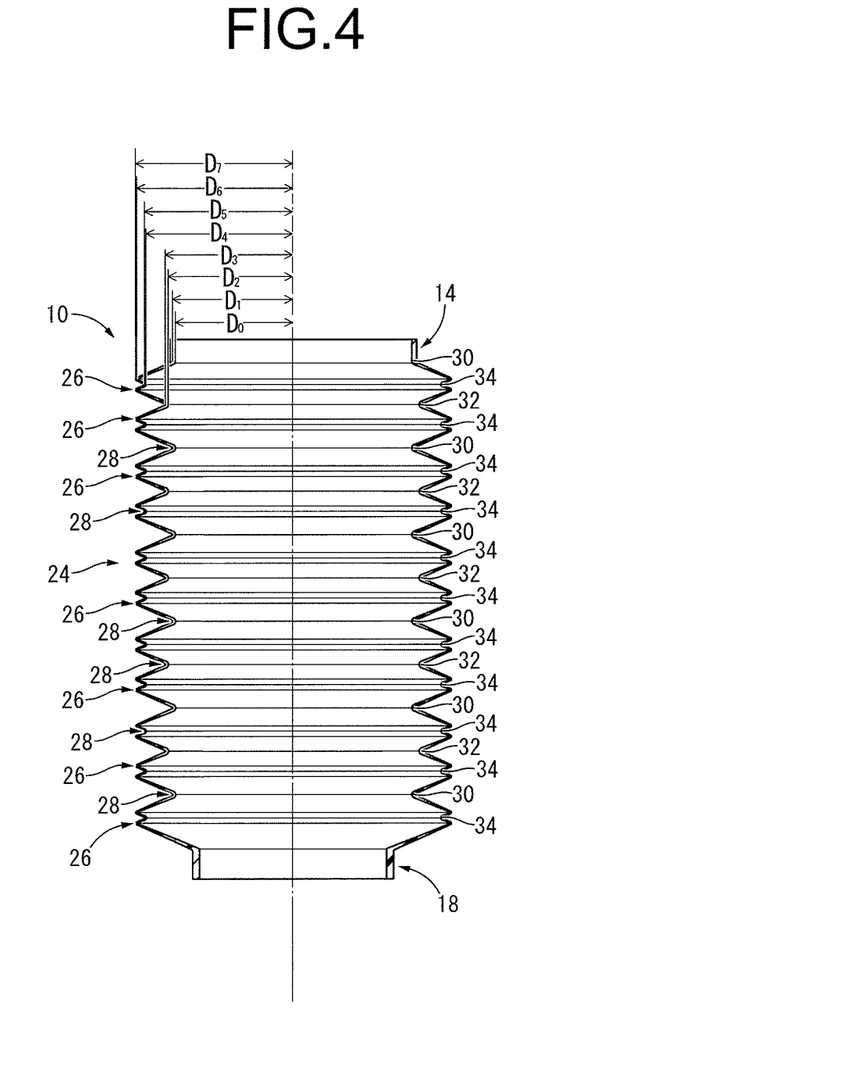
FIG. 4 is a cross-sectional view taken along line 4-4 of FIG. 3.

Furthermore, as depicted in FIG. 4, in the bellows portion 24, the thickness dimension ($D_7-D_6$) at the apexes of the peaks 26 is made smaller than the thickness dimension ($D_1-D_0$) at the bottoms of the large valleys 30 ($D_7-D_6 < D_1-D_0$). In the present embodiment, the bellows portion 24 becomes progressively thinner towards the outer peripheral side, so that the apexes of the peaks 26 are made thinnest.

In addition, the large valleys 30 and the intermediate valleys 32 have the inside and outside diameter dimensions established such that the bottoms of the large valleys 30 and the bottoms of the intermediate valleys 32 are positioned away from one another in the radial direction. Specifically, the inside diameter dimension ($D_2$) at the bottoms of the intermediate valleys 32 is made greater than the outside diameter dimension ($D_1$)) at the bottoms of the large valleys 30 ($D_1 < D_2$), so that the bottoms of the intermediate valleys 32 are positioned further to the outer peripheral side than the bottoms of the large valleys 30.

Besides, intermediate valleys 32 and the small valleys 34 have the inside and outside diameter dimensions established such that the bottoms of the intermediate valleys 32 and the bottoms of the large valleys 30 are positioned away from one another in the radial direction. Specifically, the inside diameter dimension ($D_4$) at the bottoms of the small valleys 34 is made greater than the outside diameter dimension ($D_3$) at the bottoms of the intermediate valleys 32 ($D_3 < D_4$), so that the bottoms of the small valleys 34 are positioned further to the outer peripheral side than the bottoms of the intermediate valleys 32.

Meanwhile, in the present embodiment, the differential ($D_7-D_3$) between the outside diameter dimension ($D_7$) at the apexes of the peaks 26 and the outside diameter dimension ($D_3$) at the bottoms of the intermediate valleys 32 is not less than two-thirds of the differential ($D_7-D_0$) between the outside diameter dimension ($D_7$) at the apexes of the peaks 26 and the inside diameter dimension ($D_0$) at the bottoms of the large valleys 30 ($D_7-D_3 \geq (D_7-D_0)*\frac{2}{3}$).

Moreover, in the present embodiment, the differential ($D_7-D_4$) between the outside diameter dimension ($D_7$) at the apexes of the peaks 26 and the inside diameter dimension ($D_4$) at the bottoms of the small valleys 34 is not more than one-third of the differential ($D_7-D_0$) between the outside diameter dimension ($D_7$) at the apexes of the peaks 26 and the inside diameter dimension ($D_0$)) at the bottoms of the large valleys 30 ($D_7-D_4 (D_7-D_0)*\frac{1}{3}$).

In the present embodiment in particular, the dust cover 10 is designed such that the differential ($D_5-D_3$) between the outside diameter dimension ($D_5$) at the bottoms of the small valleys 34 and the outside diameter dimension ($D_3$) at the bottoms of the intermediate valleys 32 is not less than 2.5 times the differential ($D_3-D_1$) between the outside diameter dimension ($D_3$) at the bottoms of the intermediate valleys 32 and the outside diameter dimension ($D_1$) at the bottoms of the large valleys 30. With this arrangement, the bottoms of the small valleys 34 are positioned at the outside peripheral portion of the bellows portion 24 which is sufficiently thin-walled.

Here, in FIG. 4, $D_0$ denotes the inside diameter dimension at the bottoms of the large valleys 30, $D_1$ denotes the outside diameter dimension at the bottoms of the large valleys 30, $D_2$ denotes the inside diameter dimension at the bottoms of the intermediate valleys 32, $D_3$ denotes the outside diameter dimension at the bottoms of the intermediate valleys 32, $D_4$ denotes the inside diameter dimension at the bottoms of the small valleys 34, $D_5$ denotes the outside diameter dimension at the bottoms of the small valleys 34, $D_6$ denotes the inside diameter dimension at the apexes of the peaks 26, and $D_7$ denotes the outside diameter dimension at the apexes of the peaks 26.

The dust cover 10 of this construction according to the present embodiment is mounted onto the automotive suspension mechanism, as depicted in FIG. 1. More specifically, the dust cover 10 is arranged so as to cover the upper end portion of a cylinder 36 and the lower portion of a piston rod 38 of the shock absorber 12. By the lower end portion of the upper spring support member 40 attached to a vehicle body (not shown) being inserted into the upper mounting portion 14, the upper end portion of the dust cover 10 is mounted onto the vehicle body. Meanwhile, by the cylinder 36 being inserted into the lower mounting portion 18, the lower end portion of the dust cover 10 is mounted onto the cylinder 36.

Figure 5:
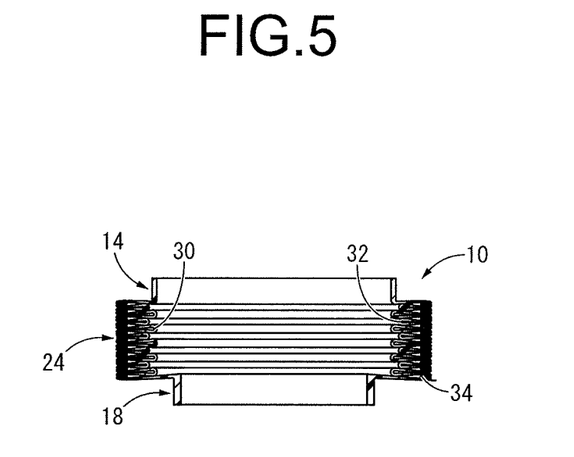
FIG. 5 is a vertical cross sectional view of the dust cover shown in FIG. 1 in a contraction state.

With the dust cover 10 mounted onto the suspension mechanism as described above, when the shock absorber 12 extends and contracts due to vibration input from the road face, the dust cover 10 follows the extension/contraction motion of the shock absorber 12 and undergoes extension/contraction deformation. That is, with the shock absorber 12 extended, the dust cover 10 extends as depicted in FIG. 4, and with the shock absorber 12 contracted, the dust cover 10 contracts as depicted in FIG. 5 so as to have a small axial dimension.

Such extension/contraction of the dust cover 10 in the axial direction is permitted by elastic deformation of the bellows portion 24. Specifically, extension of the dust cover 10 is realized by deformation of the bellows portion 24 such that the axial dimension at the opening of each of the valleys 30, 32, and 34 increases. Meanwhile, contraction of the dust cover 10 is realized by deformation of the bellows portion 24 such that the axial dimension at the opening of each of the valleys 30, 32, and 34 decreases.

It should be appreciated that since the dust cover 10 is provided with the large valleys 30, the intermediate valleys 32 and the small valleys 34, the extension/contraction stroke, namely, differential between the axial dimension during extension state and the axial dimension during contraction state, is greatly ensured.

Figure 6A:
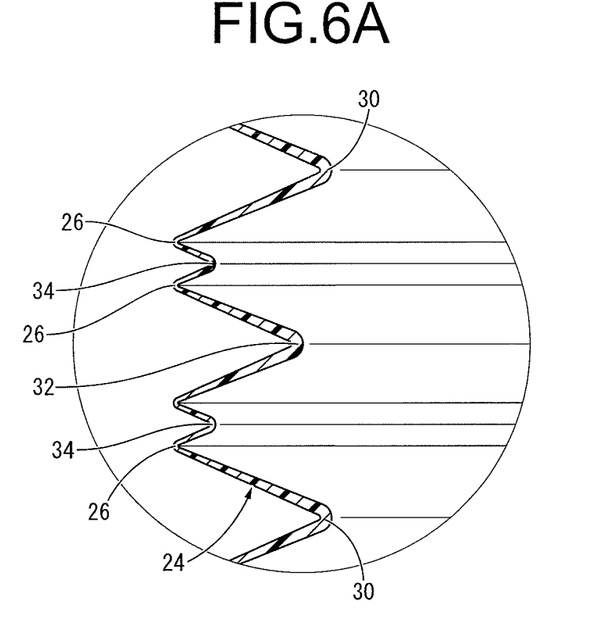
FIGS. 6A and 6B are enlarged views of principle parts of the dust cover shown in FIG. 1, wherein FIG. 6A indicates an extension state thereof, and FIG. 6B indicates the contraction state thereof.

That is, in the extension state, as depicted in FIG. 6A, owing to the small valleys 34 arranged between the large valleys 30 and the intermediate valleys 32, the axial dimension is greatly obtained by the dimension of the flared small valleys 34 without increasing the maximum outside diameter dimension of the bellows portion 24.

Figure 6B:
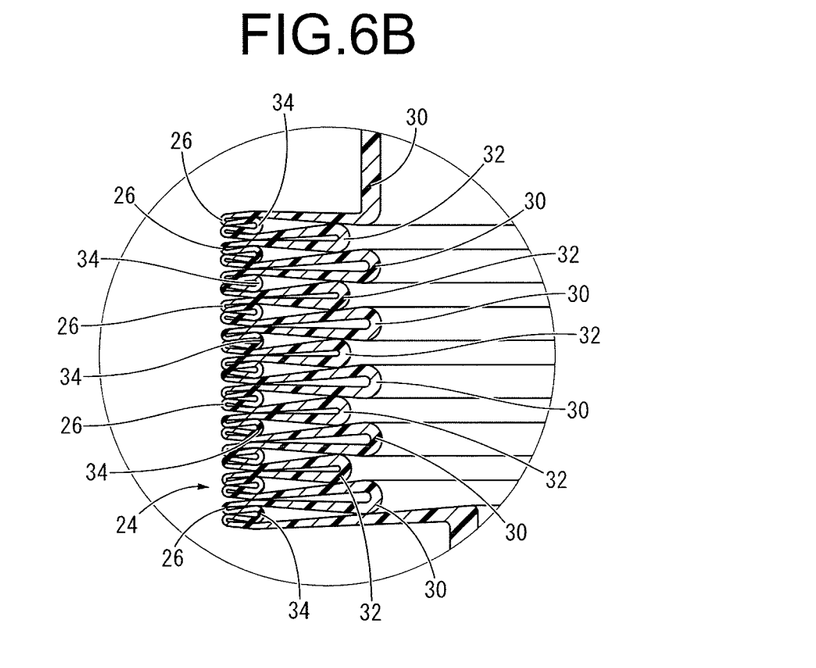

On the other hand, in the contraction state, as depicted in FIG. 6B, owing to the intermediate valleys 32 and the small valleys 34 arranged between the large valleys 30, 30 adjacent to one another in the axial direction, the bottoms of the large valleys 30, which are made thickest, are positioned away from one another in the axial direction. With this arrangement, in the contraction state, the axial dimension at the inside peripheral portion is made small in comparison with the case where the bottoms of the large valleys 30 are arranged side by side so as to contact with one another in the axial direction.

Moreover, the bottoms of the intermediate valleys 32 are positioned further to the outer peripheral side than the bottoms of the large valleys 30. Thus, the bottoms of the intermediate valleys 32 and the bottoms of the large valleys 30 adjacent to one another in the axial direction are arranged in a zigzag pattern without being aligned on a straight line in the contraction state. By so doing, it is possible to prevent increase of the axial dimension due to overlap between the bottoms of the intermediate valleys 32 and the bottoms of the large valleys 30 in the axial direction. In addition, the bellows portion 24 becomes progressively thinner towards the outer peripheral side. Thus, the axial dimension is more minimized by the bottoms of the intermediate valleys 32 being arranged so as to overlap with the medial sections of the large valleys 30 in the axial direction.

Furthermore, owing to the small valleys 34 whose inside and outside diameter dimensions at the bottoms are greater than those of the intermediate valleys 32, in the contraction state as depicted in FIG. 5, the small valleys 34 are housed so as to be wrapped between the outside peripheral edges of the large valleys 30 and the outside peripheral edges of the intermediate valleys 32, thereby minimizing the dimension in the axial direction. In particular, the bellows portion 24 becomes progressively thinner towards the outer peripheral side. Thus, all of the small valleys 34 as well as the outside peripheral edges of the large valleys 30 and the intermediate valleys 32 that wraps the small valleys 34 are thin-walled, which reduces the axial dimension at the outside peripheral portion where the small valleys 34 are provided.

In the present embodiment, the differential between the outside diameter dimension at the apexes of the peaks 26 and the outside diameter dimension at the bottoms of the intermediate valleys 32 is not less than two-thirds of the differential between the outside diameter dimension at the apexes of the peaks 26 and the inside diameter dimension at the bottoms of the large valleys 30. With this arrangement, the intermediate valleys 32 are formed with a sufficient size which is not too small in comparison with the large valleys 30. Therefore, not only the large valleys 30 but also the outside peripheral portions and the medial sections of the intermediate valleys 32 duly undergo flexural deformation during contraction, so that the small valleys 34 are housed so as to be wrapped between the large valleys 30 and the intermediate valleys 32. As a result, the dimension of the dust cover 10 during contraction is made small.

Additionally, in the present embodiment, the differential between the outside diameter dimension at the apexes of the peaks 26 and the inside diameter dimension at the bottoms of the small valleys 34 is not more than one-third of the differential between the outside diameter dimension at the apexes of the peaks 26 and the inside diameter dimension at the bottoms of the large valleys 30. With this arrangement, the small valleys 34 are positioned at the outside peripheral portions of the large valleys 30 and the intermediate valleys 32. During contraction, the small valleys 34 are housed between the outside peripheral portions of the large valleys 30 and the intermediate valleys 32, which are sufficiently thin-walled, thereby minimizing the axial dimension of the dust cover 10.

While the apexes of the peaks 26 have the outside diameter dimensions generally equal to one another and are arranged so as to overlap with one another in the axial direction, the apexes of the peaks 26 are made thinnest in the bellows portion 24. Thus, the axial dimension of the dust cover 10 never increases due to contact of the apexes of the peaks 26 with one another during contraction.

As will be appreciated from the above description, since the bellows portion 24 of the dust cover 10 includes the large valleys 30, the intermediate valleys 32, and the small valleys 34, the axial dimension is greatly obtained during the extension state without needing increase in diameter, while the axial dimension is minimized during the contraction state, thereby ensuring a large extension/contraction stroke. As a result, the dust cover 10 endowed with excellent elasticity is realized, and it is possible to provide the dust cover 10 capable of duly following extension/contraction motion of the shock absorber 12, even with the structure in which the upper and lower end portions of the dust cover 10 are fixed to the suspension mechanism.

Moreover, since there are provided the small valleys 34 whose depth dimension in the radial direction is smaller than those of the large valleys 30 and the intermediate valleys 32, and two peaks 26 are arranged between the large valleys 30 and the intermediate valleys 32, strength of the bellows portion 24 in the diametrical direction is enhanced. Therefore, an unintended deformation of the bellows portion 24 such as depression of the peaks 26 in the radial direction is avoided during mounting operation of the dust cover 10 onto the suspension mechanism. The dust cover 10 can retain the prescribed shape thereby.

Besides, as the material for forming the dust cover 10, a material that includes a thermoplastic resin is employed. Therefore, in comparison with the case where materials other than a synthetic resin (rubber or the like) are employed, the bellows portion 24 can be made thinner, making it possible to minimize the axial dimension of the dust cover 10 during contraction in particular.

The dust cover 10 of this construction according to the present embodiment is manufactured by a blow molding method including the following steps, for example.

Figure 7A:
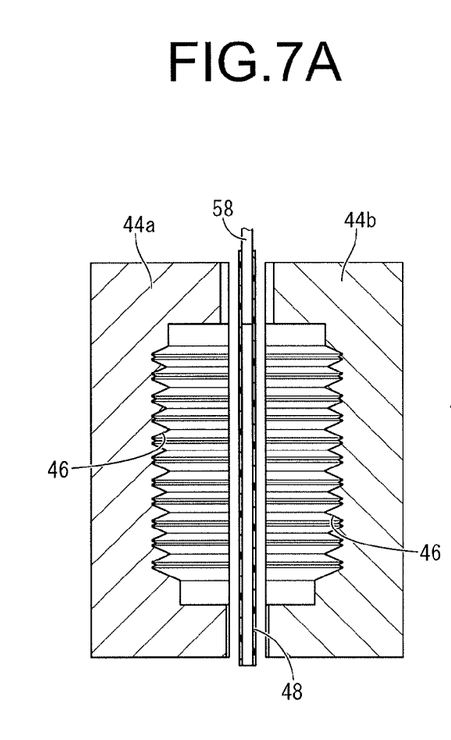
FIGS. 7A-7C are views for explaining a method of manufacturing the dust cover shown in FIG. 1, wherein FIG. 7A indicates a feeding step of a parison into a mold for molding, FIG. 7B indicates a molding step by means of pressing the parison against the mold using a compressed gas, and FIG. 7C indicates a taking-out step of a molded article from the mold.

Initially, as depicted in FIG. 7A, a pair of molds for molding 44a, 44b whose cavity 50 has an inside face corresponding to the contours of the dust cover 10 are prepared. This completes the step of preparing a mold for molding. Note that the molds for molding 44a, 44b include a concave/convex surface 46 provided on a portion of the inside face of the cavity 50 which corresponds to the outside peripheral face configuration of the bellows portion 24 (the repeated pattern of the large valley 30, small valley 34, intermediate valley 32, and small valley 34).

Subsequently, a parison 48 as a tubular forming material which is softened by heating is positioned between the molds for molding 44a, 44b. This completes the step of forming a parison. Here, as mentioned above, the parison 48 is formed of a material made from polypropylene (PP) mixed with ethylene-propylene rubber (EPDM) and dispersed, and is molded into a tubular shape by feeding or injecting, then positioned between the mold for molding 44a and the mold for molding 44b. In addition, a nozzle 58 described later is inserted into the upper opening of the parison 48.

Next, the mold for molding 44a and the mold for molding 44b approach each other and crush the parison 48 at its lower end portion so as to mold the parison 48 into a bag shape such that only the upper end portion opens. By so doing, the cavity 50 is sealed off between the molds for molding 44a, 44b and the parison 48 is positioned within the cavity 50.

Figure 7B:
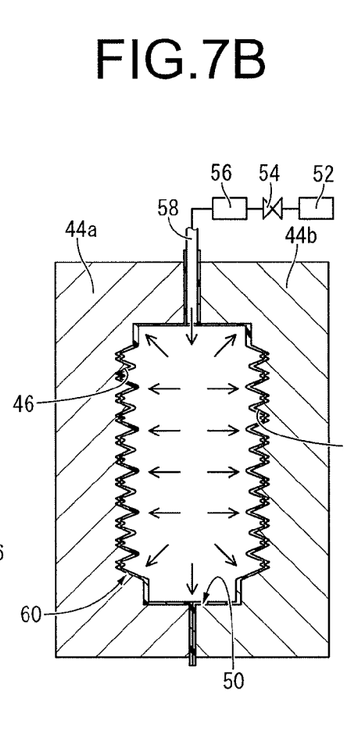

Then, by blowing a compressed gas (compressed air) from a supply apparatus 52 of the compressed gas equipped outside into the nozzle 58 via a valve 54 and a pressure regulator 56, the pressure in the hollowed portion of the parison 48 is increased. In this way, by blowing the compressed gas into the hollowed portion of the parison 48, the parison 48 is deformed so as to dilate in the radial direction and is pressed against the inside face of the cavity 50 as depicted in FIG. 7B. By so doing, the parison 48 is molded into a configuration corresponding to the inside face of the cavity 50, thereby completing the step of molding for obtaining a molded article 60 of prescribed configuration.

In accordance with such blow molding, the tubular parison 48, which is formed with generally unchanging thickness and diameter, is expanded by the pressure of the compressed gas and molded into the prescribed configuration defined by the inside face of the cavity 50. Thus, the molded article 60 becomes thinner towards the outer peripheral side. Note that in FIG. 7B, the arrows indicate the directions of action of the pressure applied by blowing the compressed gas, while any lines indicating the concave/convex on the inside peripheral face of the molded article 60 are omitted for illustrative purposes.

After stopping blowing of the compressed gas into the inside peripheral space of the molded article 60 by the valve 54, the molds for molding 44a, 44b are cooled and the molded article 60 is hardened by cooling, so that the molded article 60 firms in the prescribed configuration. This completes the step of cooling. While no particular limitation is imposed as to cooling method of the molds for molding 44a, 44b, in addition to cooling by air, cooling by coolant would also be employed.

Figure 7C:
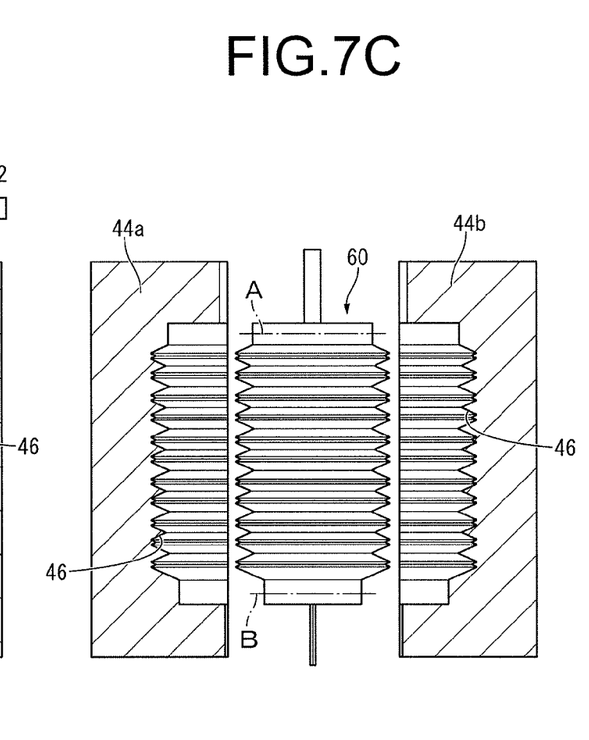

Then, as depicted in FIG. 7C, the molds for molding 44a, 44b are separated from each other, and the molded article 60 which is hardened by cooling is taken out from the cavity 50 provided between the molds for molding 44a, 44b. Lastly, by cutting away the two axial ends of the taken-out molded article 60 along the cutting lines A, B so as to complete the step of finishing, the dust cover 10 according to the present embodiment is obtained.

In this way, by employing the blow molding method, it is possible to readily realize the bellows portion 24 which becomes progressively thinner towards the outer peripheral side, so as to obtain the dust cover 10 having excellent elasticity in the axial direction.

An embodiment of the present invention has been described in detail above, but the present invention is not limited to those specific descriptions. For example, the number of the peaks 26 and the valleys 28 that constitute the bellows portion 24 is not limited in any particular way. Also, the length of the bellows portion 24 is merely exemplary.

Besides, the specific shapes of the valleys 30, 32, and 34 are not necessarily the same as those taught in the embodiment. Specifically, in the preceding embodiment, the differential between the outside diameter dimension ($D_5$) at the bottoms of the small valleys 34 and the outside diameter dimension ($D_3$) at the bottoms of the intermediate valleys 32 is not less than 2.5 times the differential between the outside diameter dimension ($D_3$) at the bottoms of the intermediate valleys 32 and the outside diameter dimension ($D_1$) at the bottoms of the large valleys 30. However, it would also be acceptable that these differentials are approximately equal with each other, and the valleys 30, 32, and 34 are formed such that the differential in depth between the large valleys 30 and the intermediate valleys 32 is made approximately equal with the differential in depth between the intermediate valleys 32 and the small valleys 34. That is, the dimensions or shapes of the large valleys 30, the intermediate valleys 32, and the small valleys 34 can be changed depending on the required elasticity or extension/contraction stroke or the like of the bellows portion 24, and are not limited in any particular way.

In addition, in the preceding embodiment, the upper end portion of the dust cover 10 is fixed to the vehicle body while the lower end portion thereof being fixed to the cylinder 36 which is the wheel side, and the dust cover 10 in the mounted state undergoes both the extension deformation and the contraction deformation in association with extension/contraction motion of the shock absorber 12. However, it would also be possible for the dust cover 10 to be fixed to the component to be mounted only at the axial one end, and undergoes either the extension deformation or the contraction deformation exclusively in association with extension/contraction of the component to be mounted. As a specific example, it may be acceptable that the upper end portion of the dust cover 10 is fixed to the vehicle body while the lower end portion thereof being merely externally fitted about the cylinder 36 to be a free end. With this arrangement, during the extension motion of the shock absorber 12, no external load will act on the dust cover 10. On the other hand, during the contraction motion of the shock absorber 12, the lower end portion of the dust cover 10 will be pushed upward by a lower spring support member fixed to the cylinder 36, so as to allow the dust cover 10 to undergo contraction deformation.

Moreover, as described in the preceding embodiment, the blow molding method is preferably employed as the manufacturing method of the dust cover 10, since the bellows portion 24 which becomes thinner towards the outer peripheral side can be readily obtained. However, no particular limitation is imposed as to the manufacturing method, and the dust cover 10 could also be manufactured by a rotational molding or the like, for example.

Furthermore, whereas the preceding embodiment illustrates the dust cover 10 for use with suspensions, the present invention can preferably be implemented in protective covers for use with other automotive components. Also, the application range of the present invention is not limited to automotive protective covers, but includes, for example, protective covers etc. for protecting joint parts of robot arms or the like.

What is claimed is:

1. A protective cover being of a tubular shape and including a bellows portion wherein a plurality of valleys outwardly concave and a plurality of peaks outwardly convex are arranged in an alternating sequence, wherein the valleys of the bellows portion comprise a plurality of large valleys and a plurality of intermediate valleys whose inside and outside diameter dimensions at bottoms are greater than an outside diameter dimension at bottoms of the large valleys, and the large valleys and the intermediate valleys are arranged in an alternating sequence, small valleys whose inside and outside diameter dimensions at bottoms are greater than the outside diameter dimension at bottoms of the intermediate valleys are respectively arranged between the large valleys and the intermediate valleys, the peaks are respectively arranged between the large valleys and the small valleys as well as between the intermediate valleys and the small valleys, and apexes of the peaks have a same outside diameter dimension as one another, and the apexes of the peaks have a thickness dimension in an axis perpendicular direction that is smaller than a thickness dimension in the axis perpendicular direction of the bottoms of the large valleys, the differential between the outside diameter dimension at the apexes of the peaks and the outside diameter dimension at the bottoms of the intermediate valleys is not less than two-thirds of the differential between the outside diameter dimension at the apexes of the peaks and the inside diameter dimension at the bottoms of the large valleys, and the differential between the outside diameter dimension at the apexes of the peaks and the inside diameter dimension at the bottoms of the small valleys is not more than one-third of the differential between the outside diameter dimension at the apexes of the peaks and the inside diameter dimension at the bottoms of the large valleys.

2. The protective cover according to claim 1, wherein the bellows portion becomes progressively thinner outward in the axis perpendicular direction.

3. The protective cover according to claim 1, wherein the bellows portion is made of a material that includes a thermoplastic resin.

* * * * *